UNITED STATES PATENT OFFICE.

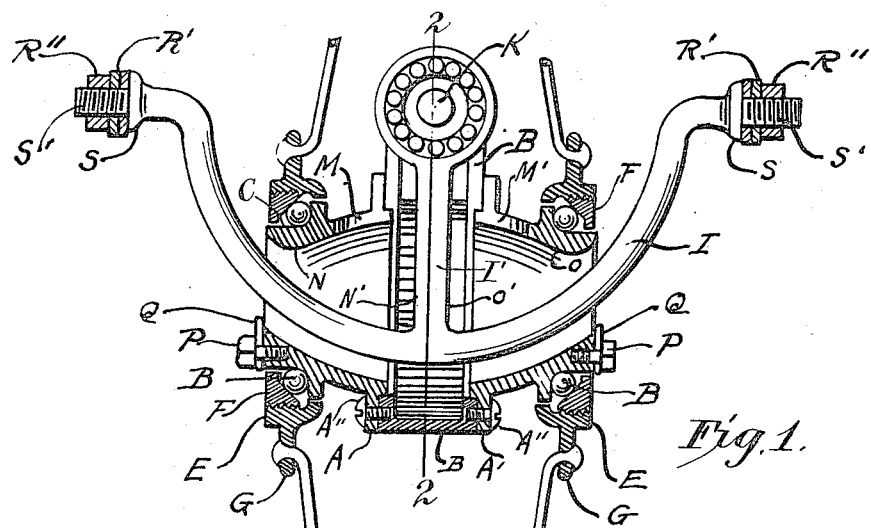

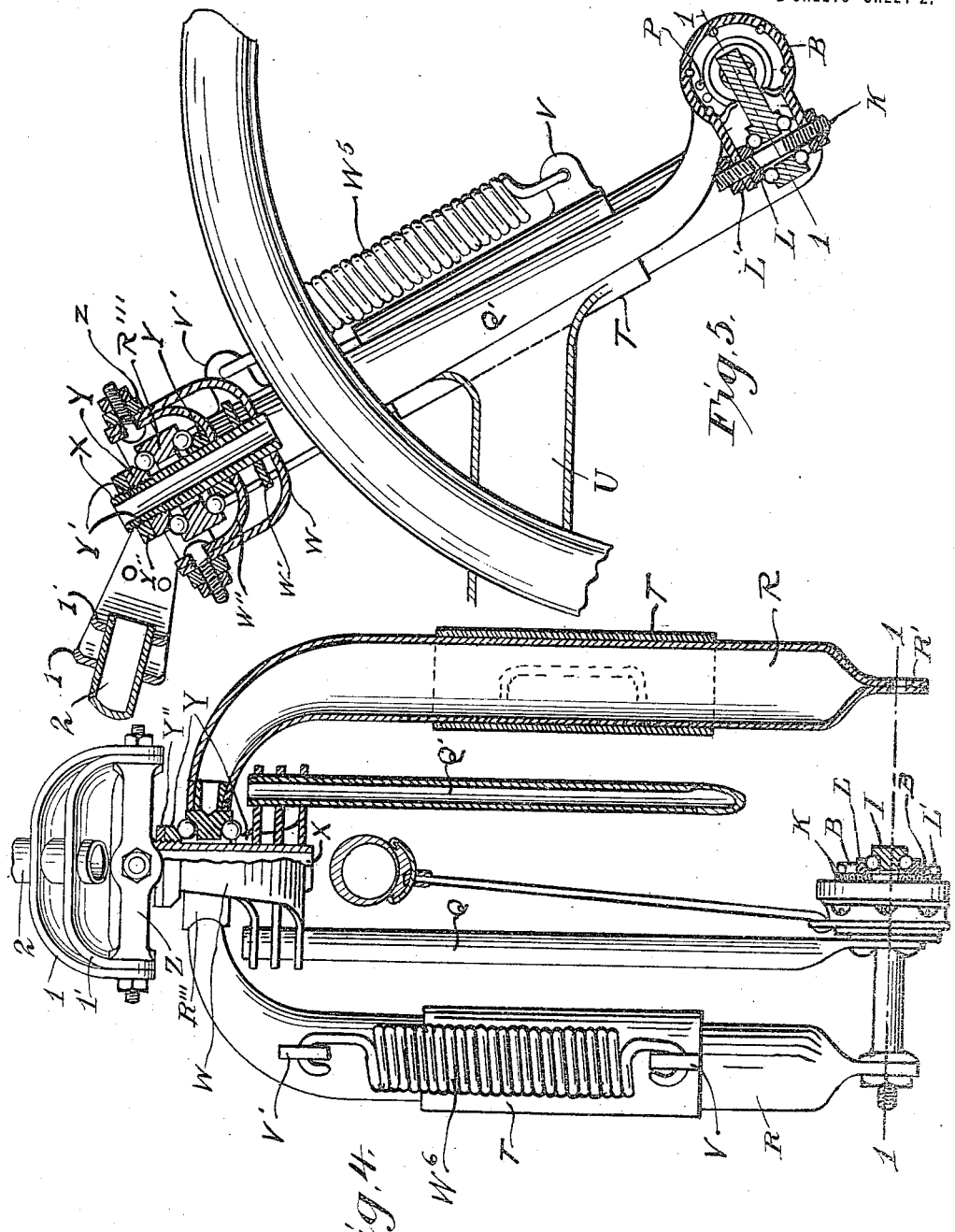

WILLIAM GEORGE MOORE, OF MIAMI, FLORIDA.

STEERING-HEAD HUB FOR TWO-WHEELED AUTOVEHICLES.

1,266,611. Specification of Letters Patent. Patented May 21, 1918.

Application filed December 21, 1915. Serial No. 67,979.

*To all whom it may concern:*

Be it known that I, WILLIAM GEORGE MOORE, a citizen of the United States, residing at Miami, in the county of Dade and State of Florida, have invented new and useful Steering-Head Hubs for Two-Wheeled Autovehicles, of which the following is a specification.

My invention relates to improvements in two wheeled auto vehicles in which the front, or steering wheel, is turned or oscillated either to the right or left on an inclined axis to steer the machine or to maintain its equilibrium;

And the objects of my invention are:

First: To provide the steering wheel with an adequate length of steering head or axis to insure greater stability and safety, than is secured in the current type of steering head and free forks.

Second: To relieve the forks and bearings of the severe and multiplied strains evident in the simple steering head and floating fork, usually employed, and which in the present commercial motorcycles and bicycles, are the weakest part of the structure.

Third: Having reduced the cramping and other strains on the bearings in the steering head, to secure an easier operated and more sensitive steering mechanism than can be secured by the short head and long floating forks, as in current practice.

Fourth: To provide such a steering mechanism as described, which may be attached to side rails or frame work in place of the usual so-called diamond frame.

The peculiar movements of the front wheel in the bicycle or motorcycle are rather difficult of analysis; but have done service throughout the development of the safety bicycle and motorcycle, proving the necessity of the inclined trunnion or steering head and the curved fork placing the true axis of tractive rotation of the steering wheel some distance ahead of the inclined axis of the steering oscillations, resulting in the almost automatic control.

But the weakness, evident in placing the steering head bearings so far from the road shocks and vibrations, and multiplying these loads and shocks by the great leverage of the floating forks, is a constant menace to the rider of both bicycle and motorcycle. The object, therefore, of my present invention is to secure the same peculiar movement of the front or steering wheel on the present type of safety bicycle and motorcycle without the leverage and danger of the floating fork on a short steering head placed away from the load, and to provide the steering head the full length of the fork, with one bearing at the upper extremity, and one within the wheel itself, at a distance back of the center of tractive rotations of the steering wheel. I attain this by the mechanism illustrated in the accompanying drawings, in which, Figure 1 is a sectional view of the axle and a portion of the front steering wheel taken on the line 1—1 of Fig. 4 and of Fig. 5; Fig. 2 is a cross-section of the axle on the line 2—2 of Fig. 1; Fig. 3 is a side elevation of one of the axle parts; and Figs. 4 and 5 are front and side elevations respectively, partly broken away, of the steering fork; yoke frame and steering head.

The axle of the steering wheel comprises the two similar right and left hand parts A and A', attached by screws A'' to the bearing extension B, which supports the lower steering head bearing. The axle parts A and A' are provided with exterior raceways C, in which the balls B coöperate with the cones F, threaded in the hub ends E, E' to form the bearings for the wheel.

The hub ends E and E' are provided with the flanges G drilled for the wire spokes H'' in the usual manner.

The trunnion yoke I, Figs. 1 and 2, provided with the lateral extension I' is adapted to receive the ball bearings J, and the axle extension B, bored to coincide therewith, and the post K, the cones L and lock nuts L', make up the lower bearing of the steering head, which is located as shown inside the wheel itself, but outside the hub at the required distance to the rear of its rotative axis to secure the same axle oscillations as are secured by the distant head and floating fork.

The inside of the axle group A—A' and B, is bored out as shown and the end pieces A and A' are slotted at M and M', providing a liberal clearance so that they may be oscillated freely about the yoke I upon the axis or steering head bearing J, within a practical steering radius.

The limits of the steering oscillations are limited only by the points N—N' and O—O', Fig. 1, coming in contact when the wheel is turned to the extreme right or left.

The ends of axle parts A and A' are drilled and tapped as shown to receive the screws P Figs. 1 and 2 to attach the lower end of steering fork Q, Q' Figs. 4 and 5; and all steering impulses are applied to the wheel through this connection.

The outer extremities of the trunnion yoke member I are flanged, and threaded at S—S' and inserted within the ends of the reciprocating yoke frame R', and clamped to it by lock nuts R".

The frame R is adapted to reciprocate in and through the guide tubes T, which are part of or attached to the side frame members U—Fig. 5. The yoke frame R and the guide tubes T are each provided with the lugs V and V', drilled to attach the close wound helical springs $W^5$ and $W^6$, which act to cushion or control the reciprocatory motion of the yoke in operation.

This frame R is formed at its upper extremity, or crown, into the bearing cage or housing R'''. The steering members Q and Q' are of the usual curved type, and are crowned with the three piece plate crown W—W' and W", as shown in Figs. 4 and 5. The crown plates are pierced and attached to the usual tubular extension or stem X, Figs. 4 and 5. The stem X is provided with the cones Y and the threaded top Y', and is inserted within the cage R''' of the yoke R, and together with the ball races, cones and lock nuts Y" form the top or upper bearing of the steering head, providing a steering head from a point near the center of the steering wheel to the top of stem X, as shown in Figs. 4 and 5, Sheet 2.

In action the entire group consisting of the frame or yoke R, the steering members Q, Q', the axle A, A', the trunion yoke I, the hubs E, E', and the wheel H, reciprocate as a solid unit within the guide tubes T, controlled by the springs $W^5$ and $W^6$ in an inclined plane, parallel to the axis of oscillation of steering impulses, and in line with the road shocks without any vertical strain whatever on the lower bearing J, the shocks being largely absorbed by the springs $W^5$, $W^6$. The forks take all vertical shocks from the wheel, and transmit them upward to the top bearing in frame R, and the frame R in turn carries all the strains and motion back to the outer extremity of the trunnion yoke I, thus insuring a very even distribution of all shocks and strains throughout the entire steering group, thereby exposing no single point or member to an overload and entirely eliminating the cramping of the balls in either upper or lower bearing, the lower bearing J taking only its share of the steering loads and stresses.

The crown plate W—W" are developed into the extension pieces, as shown, and bent upward and united to form a two armed yoke piece, attached to the ring Z by bolts permitting a swiveling movement. Also attached to the ring Z is the yoke piece 1 and 1' made up of plates similar to crown plates W and W". These plates are attached to the lower part of the steering post 2 and coöperate with the ring Z to form a large light joint which is swiveled in planes at right angles for operating the steering mechanism as shown, and affords plenty of room for the control rods or wires from the steering handle group.

Having described my invention, what I claim is:

1. In a vehicle, the combination with a steering wheel, of a frame member carrying alined upper and lower steering head bearings, and a steering fork journaled in said upper bearing and connected to the axle of said wheel, said axle having a rearward extension journaled to said lower bearing.

2. In a vehicle, a steering wheel having an axle provided with external bearings for the hub of the wheel and having lateral extensions forming the support for steering head bearings within the wheel and located at a distance from the axis of the wheel.

3. In a vehicle, a steering wheel having an axle having axial and lateral openings and provided with external bearings for the hub of the wheel and having lateral extensions forming the support for steering head bearings within the wheel and located at a distance from the axis of the wheel and an arcuate support adapted to be connected at opposite ends to a frame member, said support passing through said axial opening and having a rearwardly extending arm passing through said lateral opening and journaled in said steering head bearing.

4. In a vehicle, a steering wheel, an axle having bearings therefor, a steering fork connected to said axle, and steering head bearings located respectively at the upper end of said fork and in the rear of the axle within the wheel inclosure.

5. In a vehicle, the combination with a steering wheel, of an axle having bearings therefor and having axial and lateral openings, said axle having a lateral extension, a steering fork secured to said axle, a frame member having a bearing at its upper end in which said fork is journaled and provided at its lower end with a support passing through said axle openings and carrying a housing provided with ball races and coöperating with said lateral extension to form a lower steering head bearing.

6. In a vehicle, a steering wheel, an axle having axial and lateral openings and provided with exterior bearings for said wheel, a yoke frame member carrying a steering head bearing at its upper end and provided at its lower end with an arcuate support passing through said axial opening, said support having an arm extending rearwardly through said lateral opening and provided with ball races, lateral extensions projecting from said axle coöperating with said ball races to form a lower steering head bearing, and a steering fork journaled in said upper steering head bearing and secured to opposite ends of said axle.

7. In a steering mechanism for two-wheeled vehicles, a frame member carrying a bearing at its upper end, a steering fork journaled at its upper end in said bearing and provided with a yoke member having arms extending upon opposite sides of said bearing, a steering post extending rearwardly from said fork and at an angle thereto, a yoke member secured to the lower end of said post and a ring swiveled to the arms of said yoke members, the pivotal connections of one yoke being perpendicular to the other to thereby form a connection permitting a swiveling movement in planes at right angles to each other between the steering post and the steering fork.

8. In a steering mechanism for two-wheeled vehicles, a body frame having tubular portions or sleeves at its forward end, a yoke frame member slidable therethrough, springs connecting said yoke frame to said body frame, a steering head bearing carried by said yoke frame, a steering fork journaled at its upper end in said bearing and provided with yoke members having arms extending upwardly upon opposite sides of said bearing, a steering post extending rearwardly from said fork and at an angle thereto, a yoke member secured to the lower end of said post, and a ring-like member swiveled to said upwardly extending arms and to the yoke on said post, to form a connection permitting a swiveling movement in planes at right angles to each other between the steering post and the steering fork.

9. In a steering mechanism, for two-wheeled vehicles, a frame member carrying a bearing at its upper end, a steering fork journaled at its upper end in said bearing, a steering post extending rearwardly from said fork and at an angle thereto, a yoke member extending from the lower end of said post with its arms upon opposite sides of said bearing, a yoke extending upwardly from said steering fork upon opposite sides of said bearing and in a plane perpendicular to said steering post yoke, and a ring-member swiveled to the arms of said yokes to form a steering connection permitting a swiveling movement in planes at right angles to each other between said post and said steering fork.

10. An axle for a vehicle wheel, comprising a central annular member and oppositely arranged bearing members provided with external ball races for the wheel hubs, said bearing members having axial openings and a rearward lateral opening, and said annular member having rearward parallel extensions forming a housing for a steering head bearing, and means securing said annular and bearing members together.

WILLIAM GEORGE MOORE.

Witnesses:
L. D. LLEWELLYN,
VINCENT STEINHART.

Copies of this patent may be obtained for five cents each, by addressing the "Commissioner of Patents, Washington, D. C."